United States Patent
Kulkarni et al.

(10) Patent No.: US 8,457,998 B2
(45) Date of Patent: Jun. 4, 2013

(54) COMPUTER IMPLEMENTED METHOD FOR ANALYZING SERVICE BASED SYSTEMS USING SIMILARITY ESTIMATES, INFERENCE AND BUSINESS MODELS

(75) Inventors: Naveen Narayanrao Kulkarni, Bangalore (IN); Deepti Parachuri, Hyderabad (IN)

(73) Assignee: Infosys Limited (IN)

( * ) Notice: Subject to any disclaimer, the term of this patent is extended or adjusted under 35 U.S.C. 154(b) by 160 days.

(21) Appl. No.: 13/049,231

(22) Filed: Mar. 16, 2011

(65) Prior Publication Data
US 2012/0010915 A1 Jan. 12, 2012

(30) Foreign Application Priority Data
Jul. 7, 2010 (IN) .............................. 1929/CHE/2010

(51) Int. Cl.
*G06F 17/00* (2006.01)
(52) U.S. Cl.
USPC ........................................................ 705/7.11

(58) Field of Classification Search
USPC ........................................................ 705/7.11
See application file for complete search history.

(56) References Cited

U.S. PATENT DOCUMENTS

| | | | |
|---|---|---|---|
| 2002/0169788 A1* | 11/2002 | Lee et al. | 707/104.1 |
| 2008/0155525 A1* | 6/2008 | Ho | 717/168 |
| 2008/0162095 A1* | 7/2008 | Brunswig et al. | 703/6 |
| 2009/0083390 A1* | 3/2009 | Abu-Ghazaleh et al. | 709/209 |

* cited by examiner

*Primary Examiner* — Thomas Dixon
(74) *Attorney, Agent, or Firm* — Lerner, David, Littenberg, Krumholz & Mentlik, LLP (57) ABSTRACT

The invention provides a method, system and computer program product for analyzing a service based system. Business model data including one or more activities is received. A plurality of service characteristics is determined from the business model data for each activity group. The plurality of service characteristics are used to determine inferences regarding candidate service identification, service portfolio evaluation, service impact analysis, and so forth corresponding to the service based system.

27 Claims, 4 Drawing Sheets

COMPUTER IMPLEMENTED METHOD FOR ANALYZING SERVICE BASED SYSTEMS USING SIMILARITY ESTIMATES, INFERENCE AND BUSINESS MODELS

FIELD OF THE INVENTION

The present invention relates to service oriented architecture (SOA). More specifically, it relates to a system and method for analyzing service based systems.

BACKGROUND OF THE INVENTION

Service Oriented Architecture (SOA) is an architectural paradigm using which software resources can be published as discoverable services on a network. A service is a discoverable entity that exists as a single instance and is capable of providing rudimentary and complex business process operations. The service interacts with applications and other services via a loosely coupled, message-based communication model. A salient feature of the service is its inherent feature of hiding from the user nature of the service implementation module. This enables loose coupling between a service consumer and a service provider. Further, SOA also provides a flexible model which can be integrated using open standard architecture, thereby providing a higher level of abstraction and encapsulation.

Further, SOA enables composition of applications, processes, or more complex services from other less complex services. This enables the usage of diverse services to build applications and processes without considering details and differences of those environments. However, to enable this SOA feature, the services are constructed and exposed using coarse-grained interfaces.

Although SOA is widely used for realizing agile information technology (IT) for various business models, a methodological approach for identifying services to be exposed is needed. Additionally, a methodological approach is needed to determine services characteristics. The service characteristics may be used to measure the utility of offering one set of activities as a service over another set of activities. Additionally, different stakeholders in a business have different perspectives towards service identification. For example, business leaders may be more focused on identifying services which aids in reducing the time to market of a product. However, a chief technology officer may aim for identifying services that aid in business IT alignment. The service characteristics may be further used to cater to the different perspectives of the different stakeholders.

BRIEF SUMMARY OF THE INVENTION

The invention provides a method, system and computer program product for analyzing a service based system. Business model data including one or more activities is received. Each activity includes an action and an entity. Further, the one or more activities are grouped based on one or more similarity estimates between the one or more activities to obtain one or more activity groups. Thereafter, a plurality of service characteristics is determined from the business model data for each activity group. The plurality of service characteristics are used to select all or a subset of the activity groups as one or more candidate services.

The method, system and computer program product described above have a number of advantages. The invention as described above provides various quantitative metrics for analyzing a service based system. The present invention provides an automated system for identifying candidate services. It provides a platform in which various stakeholders (business leaders, technological officers, and so forth) can model and refine services based on quantitative criteria using data from various business models. Additionally, users can model services with a desired granularity, reuse efficiency, work unity, coupling, cohesion, autonomy, composability, and capability density thereby facilitating the realization of service orientation objectives. Further, the present invention enables subsequent to identification, verification of services for reuse across business processes.

BRIEF DESCRIPTION OF THE DRAWINGS

The various embodiments of the invention will hereinafter be described in conjunction with the appended drawings, provided to illustrate and not to limit the scope of the invention, wherein like designations denote like elements, and in which.

DETAILED DESCRIPTION

The invention provides a method, system and computer program product for analyzing service based systems. One or more service characteristics are calculated using business model data. The service characteristics are thereafter used to determine inferences relating to a candidate service identification or a service portfolio evaluation or a service impact analysis, and so forth.

Figure 1:
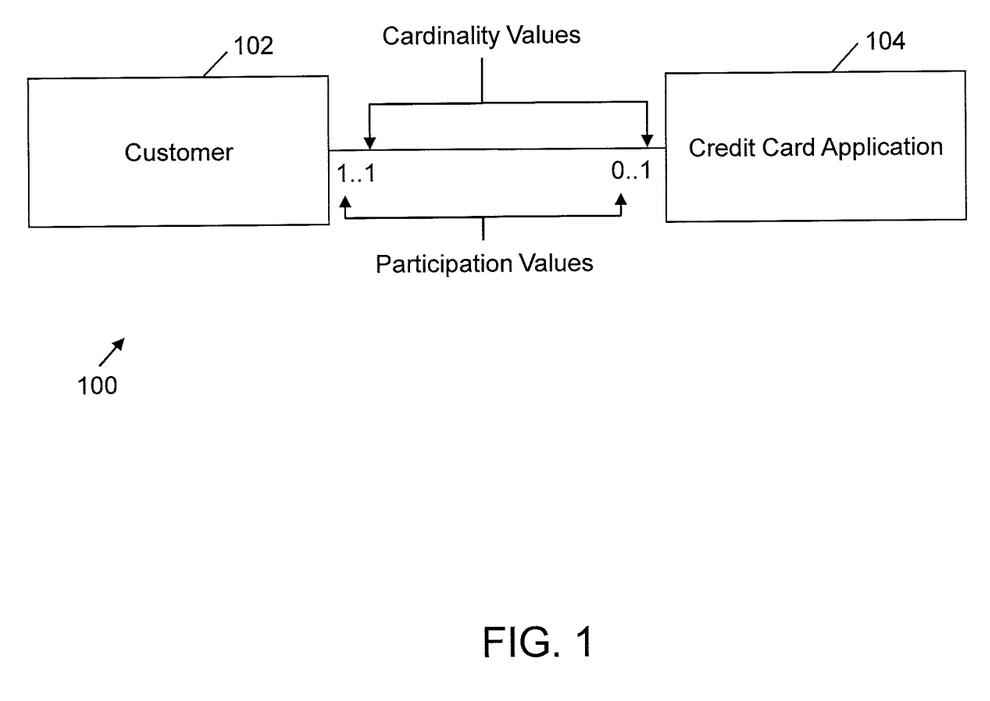
FIG. 1 represents an entity relationship diagram, in accordance with an embodiment of the present invention.
Figure 2:
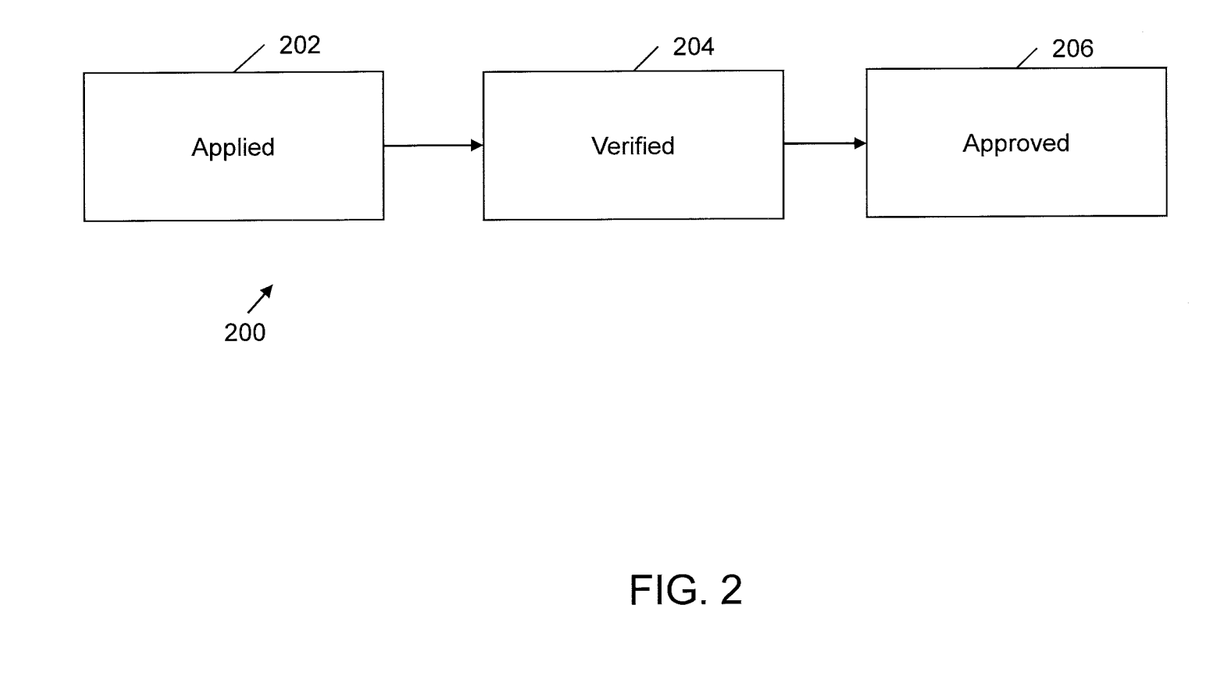
FIG. 2 represents an entity lifecycle diagram of a credit card application entity, in accordance with an embodiment of the present invention.
Figure 3:
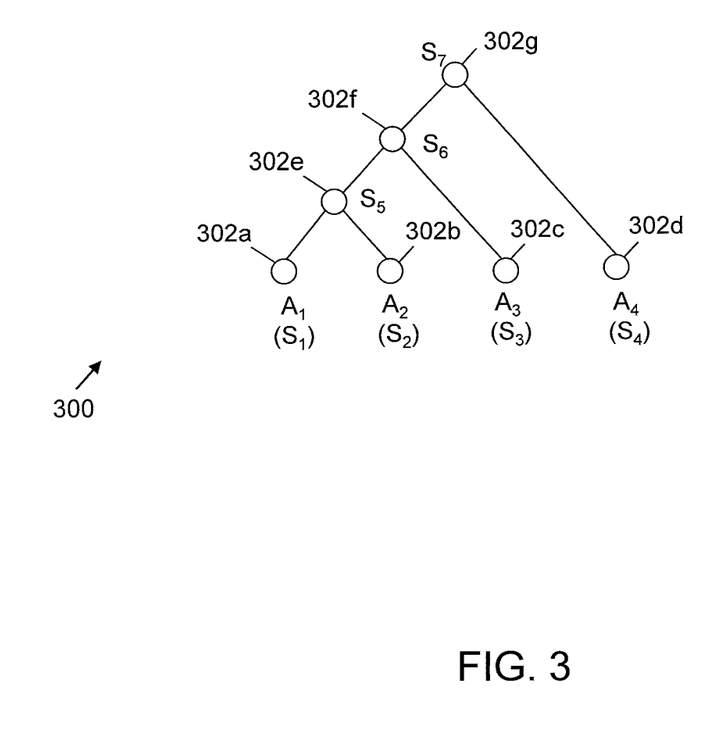
FIG. 3 represents a service cluster, in accordance with an embodiment of the present invention.
Figure 4:
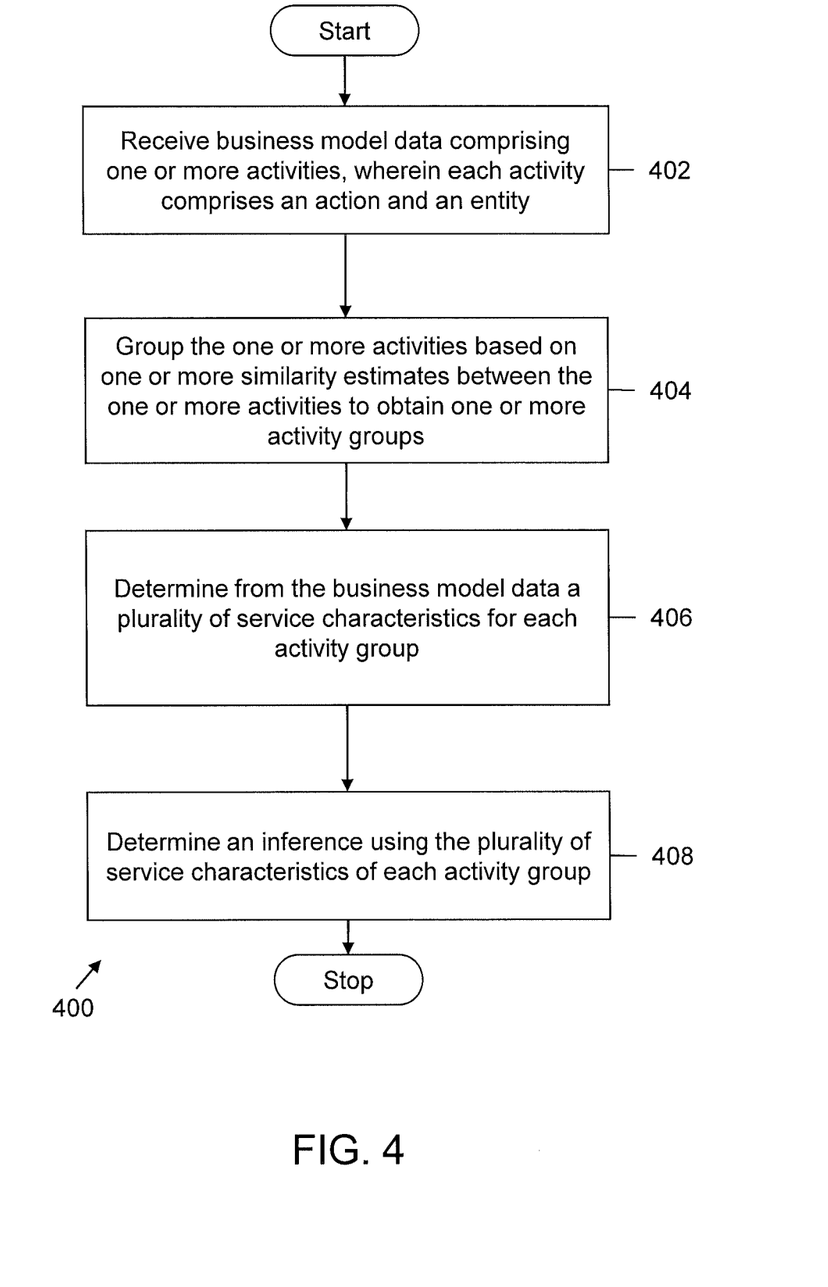
FIG. 4 represents a flowchart illustrating a method for analyzing a service based system, in accordance with an embodiment of the present invention.

FIG. 1 represents an entity relationship diagram 100, in accordance with an embodiment of the present invention. Entity relationship diagram 100 includes a customer entity 102 and a credit card application entity 104. FIG. 2 represents an entity lifecycle diagram 200 of a credit card application entity, in accordance with an embodiment of the present invention. Lifecycle diagram 200 includes applied entity state 202, verified entity state 204, and approved entity state 206. FIG. 3 represents a service cluster 300, in accordance with an embodiment of the present invention. Service cluster 300 includes nodes 302a, 302b, 302c, 302d, 302e, 302f, and 302g. FIG. 4 represents a flowchart 400 illustrating a method for analyzing a service based system, in accordance with an embodiment of the present invention. FIG. 4 has been explained in detail in conjunction with the FIGS. 1, 2, and 3.

Referring now to FIG. 4, at step 402, business model data is received. The business model data includes data related to one or more activities which form a part of the business model. Each activity belonging to a business model can be divided into an action and an entity. An example of a business model can be providing the service for application for a credit card. One of the activities in this business model may be to 'apply for a credit card'. The 'apply for a credit card' activity may be divided into 'apply for a credit card' (action) and 'credit card application' (entity). Thereafter, one or more action tuples are obtained corresponding to the one or more activities using the business model data. Each action tuple corresponds to one activity and includes a process feature, a role feature, a first entity feature, a first entity state feature, and a transition feature. The process feature includes one or more processes associated with an activity corresponding to the action tuple. The role feature includes one or more roles associated with the activity. Further, the first entity feature includes one or more entities associated with the activity and the first entity state feature includes one or more entity states associated with the activity. Furthermore, the transition feature includes one or more transition activities to which the activity transitions.

Further, one or more entity tuples are obtained corresponding to the one or more entities corresponding to the one or more activities such that one entity tuple corresponds to one entity. Each entity tuple includes an entity type feature (ET), a second entity state feature (ES), and an entity relationship feature (ER). Each entity relationship feature includes a second entity feature (E), a cardinality feature (C), and a participation feature (P). Further, each entity type feature includes a type of an entity corresponding to the entity tuple, the second entity state feature includes one or more entity states associated with the entity, the second entity feature includes one or more entities associated with the entity. The cardinality feature includes a minimum count of associations of the one or more entities associated with the entity and the participation feature includes a maximum count of associations of the one or more entities associated with the entity.

Referring to the above example of 'apply for a credit card' activity which includes the action 'apply for a credit card' and the entity 'credit card application'. The action tuple corresponding to the 'apply for a credit card' action may be represented as:

$$A_{apply\text{-}for\text{-}credit\text{-}card} = \{\{P_{credit\text{-}card\text{-}process}\}, \{R_{customer}\}, \{E_{credit\text{-}card\text{-}application}\}, E_{credit\text{-}card\text{-}application}\}, \{T_{start}, T_{establish\text{-}customer\text{-}identity}\}\} \quad (1)$$

where, $A_{apply\text{-}for\text{-}credit\text{-}card}$ represents the action 'apply for a credit card';

$P_{credit\text{-}card\text{-}process}$ represents the process feature including the one or more processes, viz. credit card process, associated with the activity corresponding to the action tuple;

$R_{customer}$ represents the role feature including the one or more roles, viz. customer, associated with the activity;

$E_{credit\text{-}card\text{-}application}$ represents the first entity feature which includes one or more entities, viz. credit card application, associated with the activity;

$^{applied}E_{credit\text{-}card\text{-}application}$ represents the first entity state feature which includes one or more entity states associated with the activity. For example, the state associated with the entity 'credit-card-application' is 'applied';

$T_{start}, T_{establish\text{-}customer\text{-}identity}$ represents the transition feature to which the activity transitions, for example, the activity 'apply for a credit card' transitions to an activity 'start' and to an activity 'establish-customer-identity.

Further, the format of the entity tuple corresponding to the entity 'credit-card-application' may be represented as:

$$E_{entity\ name} = \{ET, ES, \{C, P, E\}\} \quad (2)$$

An exemplary entity tuple may be represented as:

$$E_{credit\text{-}card\text{-}application} = \{weak, \{applied, verified, approved\}, \{1, 1, customer\}\} \quad (3)$$

where,

'weak' is the ET feature. A weak entity type has the existence dependent on other entity type, while a strong entity type does not have existence dependent on other entity type;

'applied, verified, approved' represents the ES feature that includes one or more entity states associated with the entity as represented in the FIG. 3;

'1, 1, customer' represents the ER feature, in which '1' is the value of C feature, '1' is the value of P feature, and 'customer' is the E feature as represented in the FIG. 2.

At step 404, the one or more activities are grouped based on a plurality of similarity estimates between the one or more activities to obtain one or more activity groups. It should be understood by persons skilled the art that to decide upon the similarity between two sets of data, a basis is chosen which is common to the sets that are being compared. In an embodiment of the present invention, Jaccard Distance (JD) is chosen as a similarity estimate to measure similarity between the one or more activities. In another embodiment of the present invention, any other suitable similarity estimate known in the art such as Euclidean distance, Manhattan distance measure, correlation coefficient, probabilistic measures, and so forth is used.

The JD between two action tuples (1) and (4) (mentioned below)

$$A_{establish\text{-}customer\text{-}identity} = \{\{P_{credit\text{-}card\text{-}process}\}, \{R_{back\text{-}office}\}, \{E_{credit\text{-}card\text{-}application}, E_{customer}\}, \{^{applied}ES_{credit\text{-}card\text{-}application}, ^{identified}ES_{customer}\}, \{T_{apply\text{-}for\text{-}credit\text{-}card}, T_{perform\text{-}credit\text{-}check}\}\} \quad (4)$$

is calculated as the distance between the corresponding elements such as P, R, E, ES, and T of the two action tuples (1) and (4). Thus, the JD between the (1) and (4) may be represented as:

$$JD(1,4) = \{0, 0, 0.5, 0.5, 0\} \quad (5)$$

Since, similarity between the action tuples is the inverse of JD, thus similarity between (1) and (4) can be represented as below:

$$\text{Similarity}(1, 4) = 1 - JD(1, 4) \quad (6)$$

Similarly, the similarities between the various entity tuples may be calculated.

Thereafter, a grouping technique is selected for clustering the various activities into activity groups. Each activity group includes a set of similar activities. Various grouping techniques are known in the art such as hierarchical clustering, agglomerative clustering, divisive clustering, and partitional algorithms. In an embodiment of the present invention, any one of the various grouping techniques is used for clustering the one or more activities. Hereinafter, various embodiments of the present invention have been described in conjunction with agglomerative hierarchical clustering used for grouping similar activities.

Subsequent to choosing agglomerative hierarchical clustering as the clustering technique, one or more proximity matrices are obtained corresponding to the one or more activities for each feature (P, R, E, ES, and T) of an action tuple. Exemplary action tuple data is represented in the table—A below:

TABLE A

| | Feature | | | | |
|---|---|---|---|---|---|
| Activity | Process | Role | Entity | Entity State | Transition |
| A1 | P1 | R1 | E1 | E1/Applied | NULL, A2 |
| A2 | P1 | R2 | E1, E2 | E2/Unknown, E2/Identified | A1, A3 |
| A3 | P1 | R2 | E1, E2, E3 | E1/Applied, E1/Credit Verified | A2, A4, A12 |

TABLE A-continued

| | | | Feature | | |
|---|---|---|---|---|---|
| Activity | Process | Role | Entity | Entity State | Transition |
| A4 | P1 | R2 | E1, E3 | E1/Credit Verified, E1/Initiate | A3, A5 |
| A5 | P1 | R3 | E1, E3 | E1/Initiate, E1/Limit Set | A4, A6 |

Using Table—A, various proximity matrices corresponding to each feature of an action tuple are obtained using one of the similarity estimates mentioned above. Tables—B, C, D, and E below represent proximity matrices corresponding to the P feature, R feature, E feature, ES feature, and T feature respectively.

TABLE B

| | A1 | A2 | A3 | A4 | A5 |
|---|---|---|---|---|---|
| A1 | 0 | 0 | 0 | 0 | 0 |
| A2 | 0 | 0 | 0 | 0 | 0 |
| A3 | 0 | 0 | 0 | 0 | 0 |
| A4 | 0 | 0 | 0 | 0 | 0 |
| A5 | 0 | 0 | 0 | 0 | 0 |

TABLE C

| | A1 | A2 | A3 | A4 | A5 |
|---|---|---|---|---|---|
| A1 | 0 | 1 | 1 | 1 | 1 |
| A2 | 1 | 0 | 0 | 0 | 1 |
| A3 | 1 | 0 | 0 | 0 | 1 |
| A4 | 1 | 0 | 0 | 0 | 1 |
| A5 | 1 | 1 | 1 | 1 | 0 |

TABLE D

| | A1 | A2 | A3 | A4 | A5 |
|---|---|---|---|---|---|
| A1 | 0 | 0.5 | 0.67 | 0.5 | 0.5 |
| A2 | 0.5 | 0 | 0.33 | 0.67 | 0.67 |
| A3 | 0.67 | 0.33 | 0 | 0.33 | 0.33 |
| A4 | 0.5 | 0.67 | 0.33 | 0 | 0 |
| A5 | 0.5 | 0.67 | 0.33 | 0 | 0 |

TABLE E

| | A1 | A2 | A3 | A4 | A5 |
|---|---|---|---|---|---|
| A1 | 0 | 1 | 1 | 0.5 | 0 |
| A2 | 1 | 0 | 1 | 1 | 1 |
| A3 | 1 | 1 | 0 | 0.67 | 0 |
| A4 | 0.5 | 1 | 0.67 | 0 | 0.67 |
| A5 | 1 | 1 | 1 | 0.67 | 0 |

Similarly, an entity proximity matrix is obtained using the entity tuple data. The proximity matrices and the entity proximity matrix are added to obtain a cumulative proximity matrix. Thereafter, the hierarchical clustering is used to group the activities, A1, A2, A3, A4, and A5 based on the proximity values. The activities are merged using any of the known in the art merging techniques such as single linkage, average linkage, and complete linkage. The merger iterations are continued until the activities A1, A2, A3, A4, and A5 are merged into one service cluster.

Referring now to FIG. 3, a service cluster 300 is shown. Service cluster 300 is a portion of a service grouping arrangement obtained subsequent to the application of hierarchical clustering technique to the business model data depicted in Table—A. Each of nodes 302a, 302b, 302c, 302d, 302e, 302f, and 302g corresponds to an activity group including one or more activities. For example, node 302a corresponds to activity A1. Similarly, nodes 302b, 302c, 302d, 302e, 302f, and 302g correspond to activities/activity groups A2, A3, A4, {A1, A2}, {A1, A2, A3}, {A1, A2, A3, A4} respectively.

At step 406, a plurality of service characteristics are calculated for each activity group represented by nodes 302a, 302b, 302c, 302d, 302e, 302f, and 302g. The plurality of service characteristics include a normalized abstraction index (NAI), reuse efficiency index (REI), capability density index (CDI), composability index (CI), autonomy index (AI), work unitization index (WUI), and basic modularity index (BMI).

In an embodiment of the present invention, the NAI, which measures the number of functionalities offered by an activity group, is calculated. The NAI enables a software architect to assess an amount of productive work that can be obtained by offering an activity group as a service. Further, the NAI is also related to the granularity of a service. It should be realized by persons skilled in the art that granularity is used to decide the extent to which a service can be reused. Higher the value of NAI, higher is the reusability of the service. Additionally, NAI also indicates the ability of the service to provide high order problem solving capabilities.

The NAI is calculated corresponding to each node of service cluster 300 (refer FIG. 3) using the action and entity tuples in the manner described below:

$$\text{Depth of } i \, d = \begin{cases} 0 & \text{if } n = 1 \\ |\ln(n) + 1| & \text{if } n \text{ is even} \\ |\ln(n) + 2| & \text{if } n \text{ is odd} \end{cases} \quad (1)$$

$$\text{Normalized size measure } s = \sqrt{\frac{\sum_{j=1}^{y}\left(\sum_{i=1}^{n} x_{ij}\right)^2}{y}} \quad (2)$$

$$\text{Activity abstraction uniformity for depth } d \text{ is, } AU = \frac{s}{d} \quad (3)$$

$$\text{Information density at depth } d \text{ is, } ID = \frac{\sum_{i=1}^{k}(E \times 1/x_e)}{y} \quad (4)$$

where,
d=depth of the node
x=number of activities associated with the node;
y=number of total service offered using the node;
k=number of entities at depth d;
n=number of activities associated the one or more activity groups;
$x_e$=0.5, if entity e is strong;
=1, if entity e is weak;

Normalized Abstraction Index for depth d is,
NAI=AU×ID    (5)

In another embodiment of the present invention, REI is calculated that is related to the ability of reusing the functionality offered by the service as a whole rather than individual functionalities offered by the service. The REI can be calculated using business model data in a manner as described below:

assuming:
A to be a set of the one more activities ($A_1$, $A_2$, $A_3$. . . ) in service cluster 300 (refer FIG. 4);

E to be a set of the one or more entities ($E_1, E_2, E_3...$) associated with the service cluster 300;

ES to be a set of entity states ($ES_1, ES_2, ES_3...$) corresponding to E such that, ES' subset of ES→$A_i$;

S to be a set of services ($S_1, S_2, S_3$) such that $\forall S_j \exists A_i$ subset of A;

Therefore, REI of $S_j$ is given by the conditional probability of $S_j$ being reused based on reuse event R={$R_1, R_2...$} corresponding to ES' represented as:

$$P(S_j|R) = P(ES'|R) = \Sigma_{n \in ES} P(ES_n|R_n) \quad (6)$$

Where,

P ($ES_i$)=probability of an entity state being used;

P($R_i|ES_i$)=conditional probability of the same entity state being reused;

$R_i$=reuse event related to entity state $ES_i$;

Applying Baye's theorem the probability of, $$P(ES_n | R_n) = \frac{P(ES_n)P(R_n | ES_n)}{\sum_{i=1}^{k} P(ES_k)P(R_k | ES_k)} \quad n = 1, 2, \ldots k \quad (7)$$

In yet another embodiment of the present invention, CI is calculated that quantifies the ease with which a service can be compounded with one or more services to form a higher granular service. This compounding ease in turn depends on the ease with which one service communicates with other services. It should be realized by persons skilled in the art that this trait of services enables creation of agile solutions by mixing different services on a need basis. The CI may be calculated as: assuming:

A to be a set of the one more activities ($A_1, A_2, A_3...$) in service cluster 300 (refer FIG. 4);

E to be a set of the one or more entities ($E_1, E_2, E_3...$) associated with service cluster 300 such that, E' subset of E→$A_i$;

S to be a set of services ($S_1, S_2, S_3...$) such that $\forall S_j \exists A_i$ subset of A;

($E_i$) to be the discrete probability of occurrence of entity $E_i$;

Thus, using Kullback-Leibler (KL) divergence, divergence E for service cluster 300 may be calculated as:

$$D_{KL}(E) = \ln N + \sum_{i=1}^{N} P(E_i) \ln P(E_i) \quad (8)$$

It should be understood by persons skilled in the art that KL divergence provides divergence between a uniform probability distribution and the probability distribution ($E_i$).

Similarly, assuming P($E'_i$) to be the discrete probability measure of occurrence of entity $E'_i \in A' \cap A' \to S_j$;

Using KL divergence, divergence of E' for a service $S_j$ may be calculated as:

$$D_{KL}(E' | S_j) = \ln M + \sum_{i=1}^{M} P(E'_i) \ln P(E'_i) \quad (9)$$

Thus, calculation of CI for $S_i$ may be mathematically represented as:

$$CI(S_i) = 1 - \frac{D_{KL}(E' | S_j)}{D_{KL}(E)} \quad (10)$$

In still another embodiment of the present invention, AI is calculated that estimates the probability of a service of not being dependent on other services to deliver its functionalities. It should be realized by persons skilled in the art that a service is designated as dependent on other services when the service uses information that has not been generated by that service.

AI may be calculated in the manner as described below: assuming:

A to be a set of the one more activities ($A_1, A_2, A_3...$) in the service cluster 300;

E to be a set of the one or more entities ($E_1, E_2, E_3...$) associated with service cluster 300 such that, E' subset of E→$A_i$;

S to be a set of services ($S_1, S_2, S_3...$) such that $\forall S_j \exists A_i$ subset of A;

$P_{S_j}(R)$ to be the probability of $S_j$ reading information entities E';

$P_{S_j}(M)$ to be the probability of $S_j$ modifying information entities E'.

Thus, AI of service $S_j$ may be calculated as the conditional probability, $P_{S_j}(R|M)$, of simultaneously reading and modifying information entities and can be mathematically represented as:

$$P_{S_j}(R | M) = \sum_{e \in E'} P_e(R | M) \quad (11)$$

In still another embodiment of the present invention, WUI, that quantifies a unified work performance exhibited by a service, is calculated. A service is considered exhibiting unity of work performed, when the various entities the service modifies or uses are related.

WUI may be calculated in the manner described below: assuming:

A to be a set of the one more activities ($A_1, A_2, A_3...$) in the service cluster 300;

E to be a set of the one or more entities ($E_1, E_2, E_3...$) associated with service cluster 300 such that, E' subset of E→$A_i$;

S to be a set of services ($S_1, S_2, S_3$) such that $\forall S_j \exists A_i$ subset of A;

P($E_i$) to be the discrete probability of occurrence of entity $E_i$;

P($E'_i$) to be the discrete probability of occurrence of entity $E'_{i \in A' \cap A' \to S_j}$;

Thus, WUI of $S_j$ defined as a relative entropy, $H_{S_j}(E'||E)$, between P($E_i$) and P($E'_i$) and may be calculated as:

$$H_{S_j}(E' \| E) = \sum_{E'} P(E') \ln \frac{P(E')}{P(E)} \quad (12)$$

In still another embodiment of the present invention, CDI, that measures probability of number of capabilities in a service, is calculated. The number of capabilities offered by a service depends on the number of activities associated with the service. The number of capabilities offered by the service is normally distributed with respect to the number of activities associated with the service.

Thus, CDI may be calculated in the manner as described below:

assuming:

A to be a set of the one more activities $(A_1, A_2, A_3 \ldots)$ in service cluster 300;

S to be a set of services $(S_1, S_2, S_3 \ldots)$ such that $\forall S_j \exists A_i$ subset of A;

CDI of a service corresponds to the probability density function $f(x)$ of the distribution of the number of capabilities of the service and x is the number of activities associated with the service.

Further, $f(x)$ for a service may be obtained based on the z-table of normalized distribution where z statistic is obtained using the mathematical expression:

$$z = \frac{(x-\mu)}{\sigma} \quad (13)$$

where, $\mu$=mean of the population space of number of activities associated with a service;

$\sigma$=standard deviation of the population space of number of activities associated with the service.

In still another embodiment of the present invention, BMI, that measures modularity of service, is calculated. BMI is defined as the ratio of the product of an action coupling index and an entity coupling index to the product of an action cohesion index and an entity cohesion index and is calculated corresponding to each activity group.

Thus, BMI corresponding to an activity group (for example a cluster r) may be calculated in the manner as described below by calculating the cohesion index:

assuming:

$A_r$ =activities associated with the cluster r and $|A_r|$ is the number of activities associated with the cluster;

$E_r$ =entities associated with the cluster r and $|E_r|$ is the number of entities in the cluster;

$S_r$ =entity states associated with the cluster r, $|S_r|$ is the number of entity states;

n'=number of relationships among $E_r$;

|Re|=number of relationships associated with an entity e, in which $e \in E_r$;

$c_{ij}$ =relationship cardinality of an entity;

s=instance of an entity state;

$$a_{ij} = \begin{cases} 1, & \exists s \in \bigcup_{i=1}^{r} S_i \\ 0, & \text{otherwise}; \end{cases}$$

$\phi_{act}$ =action cohesion index of the cluster due to structural properties of the activities associated with the cluster;

$\phi_{ent}$ =entity cohesion index of the cluster due to information connectedness (non-structural properties) of the activities associated with the cluster;

$x_a$ and $x_e$ are experiential variables that determine the influence of structural and non-structural properties respectively on the cohesion and coupling indexes;

$$\varphi_{act} = \frac{\sum_{\substack{i \in Ar \\ j \in Sr}} a_{ij}}{|A_r| \times |S_r|} \quad (14)$$

$$\varphi_{ent} = \frac{\sum_{\substack{i \in Ar \\ j \in Sr}} a'_{ij}}{|A_r| \times |E_r|} \quad (15)$$

$$a'_{ij} = \frac{\sum_{i=1}^{n'} c_{ij}}{|R_e|} \quad (16)$$

Cohesion index $\varphi_r = x_a \varphi_{act} + x_e \varphi_{ent}$ (17)

Further, the coupling index may be calculated as follows:

assuming:

$$p_{ij} = \begin{cases} 0 & \text{if there is no relationship between } i \text{ and } j \text{ entities} \\ 0.25 & \text{if participation of } j \text{ entity in } i \text{ relationship is } 0 \\ 0.50 & \text{if participation of } j \text{ entity in relationship is } 1; \end{cases}$$

$m$ = number of relationships between entities ($E$) associated with the one or more clusters;

$n$ = number of relationships between $E_r$;

$A_e$ = number of activities associated with an entity $e$, in which $e \in E$;

$$c_i = \begin{cases} 1, & \exists E_r: E_r \text{ subset of } E \\ 0, & \text{otherwise}; \end{cases}$$

$\omega_{act}$ = action coupling index of the cluster due to structural properties;

$\omega_{ent}$ = entity coupling of index of the cluster due to information connectedness;

$\vartheta_e$ = degree of coupling introduced by an entity $e$ due to the relationship of the entity with other entities;

$$b_{ij} = \begin{cases} 1 & \text{if activity } A_i \text{ transitions into } A_j \text{ only} \\ 1 & \text{if activity } A_i \text{ transitions into } A_j \text{ through an AND gate} \\ \dfrac{1}{n''} & \text{if activity } A_i \text{ transitions to a XOR gate and } n'' \text{ is number of transitions from } A_i \\ \dfrac{1}{(2^{n''}-1)} + \dfrac{(2^{n''}-1)-1}{(2^{n''}-1)} \times \dfrac{1}{n''} & \text{if activity } A_i \text{ transitions to a OR gate an } n'' \text{ is number of transitions from } A_i \end{cases}$$

$$b_{ji} = \begin{cases} 1 & \text{if activity } A_j \text{ transitions into } A_i \text{ only} \\ 1 & \text{if activity } A_j \text{ transitions into } A_i \text{ through an AND gate} \\ \dfrac{1}{m'} & \text{if activity } A_j \text{ transitions to a OR gate and } m' \text{ is number of transitions to OR gate} \\ \dfrac{1}{(2^{m'}-1)} + \dfrac{(2^{m'}-1)-1}{(2^{m'}-1)} \times \dfrac{1}{m'} & \text{if activity } A_i \text{ transitions to a OR gate an } m' \text{ is number of transitions from } A_i \end{cases}$$

$$\omega_{act} = \frac{\log\left(\sum_{\substack{i \in A_r \\ j \notin A_r}} (b_{ij} + b_{ji})\right)}{\log(|A| - |A_r|)} \quad (18)$$

$$\omega_{ent} = \frac{\sum_{e \in E_r} \dfrac{\partial_e \sum_{i \in A_r} c_i}{A_e}}{E_r} \quad (19)$$

$$\partial_e = 1 - \frac{\sum_{i=1}^{n} p_{ij}}{\sum_{j \in E_r}\left(\sum_{j=1}^{m} p_{ij}\right)} \quad (20)$$

Coupling index $\omega_r = x_a \omega_a + x_e \omega_e$ (21)

$$BMI = \frac{\omega_r}{\varphi_r} \quad (22)$$

At step 408, the one or more service characteristics are selected for analyzing an activity group based on a service analysis objective. For example, when the analysis of the service based system is performed by a business leader, business objectives such as time to market, establish better compliance, establish process integrity, reduce cost, and so forth are chosen as service analysis objectives. Further, when the analysis of the service based system is performed by a technical expert, technical objectives such as rapid aggregation, easier modification, streamlining of processes, and so forth are chosen as service analysis objectives. Based on the service analysis objectives, one or more relevant service characteristics are selected. For example, when the objective is time to market, AI, WUI, and CI are selected as the relevant service characteristics. Further, when establish better compliance is the analysis objective, WUI, REI, and NAI are selected as the relevant service characteristics. Subsequently, the values of the selected service characteristics are compared with corresponding one more predetermined thresholds. Based on the results of the comparison, inferences are determine candidate service identification or service portfolio evaluation or service impact analysis, and so forth. For example, when service identification is being performed, using prior analysis exemplary predetermined thresholds of the various service characteristics are determined to be:
NAI=7, REI=50%, CDI=35%, CI=70%, AI=30%, WUI=20%, and BMI=20%.

Thus, an activity group having values of NAI, REI, CDI, CI, Al, WUI above the corresponding predetermined thresholds and having the value of BMI below the BMI predetermined thresholds may be offered as a service. Further, the above described service characteristics may be calculated for different subset activity groups of an activity group. Thereafter, a comparison may be made of subset service characteristics with the predetermined thresholds. The activity subsets having service characteristics above the thresholds may be offered as services. In an embodiment of the present invention, a visual interface is provided for modifying each activity group to obtain one or more subset activity groups corresponding to which the various service characteristics are calculated. Thereafter, the selected one or more activity groups or subset activity groups are published as one or more candidate services.

The present invention may also be embodied in a computer program product for analyzing service based systems. The computer program product includes a computer usable medium having a set program instructions comprising a program code for analyzing a service based system. The set of instructions may include various commands that instruct the processing machine to perform specific tasks such as the steps that constitute the method of the present invention. The set of instructions may be in the form of a software program. Further, the software may be in the form of a collection of separate programs, a program module with a large program or a portion of a program module, as in the present invention. The software may also include modular programming in the form of object-oriented programming. The processing of input data by the processing machine may be in response to user commands, results of previous processing or a request made by another processing machine.

While the preferred embodiments of the invention have been illustrated and described, it will be clear that the invention is not limit to these embodiments only. Numerous modifications, changes, variations, substitutions and equivalents will be apparent to those skilled in the art without departing from the spirit and scope of the invention, as described in the claims.

The invention claimed is:

1. A computer-implemented method for analyzing a service based system, the method comprising:
   receiving, by a computer, business model data comprising one or more activities, wherein each activity comprises an action and an entity;
   grouping the one or more activities, by a processing machine on a computer, based on one or more similarity estimates between the one or more activities to generate one or more activity groups;
   determining from the business model data, by the processing machine on the computer, a plurality of service characteristics for each activity group; and
   determining an inference, by the processing machine on the computer, using the plurality of service characteristics of each activity group based on the one or more service analysis objectives, wherein the determined inference facilitates to identify one or more services of the service based system which are to be exposed.

2. The computer-implemented method according to claim 1 further comprising obtaining one or more action tuples, by the processing machine on the computer, corresponding to the one or more activities using the business model data, wherein one action tuple corresponds to one activity, wherein an action tuple comprises a process feature, a role feature, a first entity feature, a first entity state feature, and a transition feature, wherein the process feature comprises one or more processes associated with an activity corresponding to the action tuple, wherein the role feature comprises one or more roles associated with the activity, wherein the first entity feature comprises one or more entities associated with the activity, wherein the first entity state feature comprises one or more entity states associated with the activity, and wherein the transition feature comprises one or more transition activities to which the activity transitions.

3. The computer-implemented method according to claim 2 further comprising obtaining one or more proximity matrices, by the processing machine on the computer, corresponding to the process feature, the role feature, the first entity feature, the first entity state feature, and the transition feature, wherein the one or more proximity matrices are obtained using the one or more action tuples.

4. The computer-implemented method according to claim 3 further comprising obtaining one or more entity tuples, by the processing machine on the computer, corresponding to the one or more entities using the business model data, wherein one entity tuple corresponds to one entity, wherein an entity tuple comprises an entity type feature, a second entity state feature, and an entity relationship feature, wherein the entity relationship feature comprises a second entity feature, a cardinality feature, and a participation feature, wherein the entity type feature comprises a type of an entity corresponding to the entity tuple, wherein the second entity state feature comprises one or more entity states associated with the entity, wherein the second entity feature comprises one or more entities associated with the entity, wherein the cardinality feature comprises minimum count of associations of the one or more entities associated with the entity, wherein the participation feature comprises maximum count of associations of the one or more entities associated with the entity.

5. The computer-implemented method according to claim 4 further comprising obtaining an entity proximity matrix, by the processing machine on the computer, using the one or more entity tuples.

6. The computer-implemented method according to claim 5 further comprising obtaining a cumulative proximity matrix, by the processing machine on the computer, using the one or more proximity matrices and the entity proximity matrix, wherein the cumulative proximity matrix comprises the plurality of similarity estimates between the one or more activities, wherein the plurality of similarity estimates are obtained using at least one of Jaccard Distance measure, Manhattan Distance measure, correlation coefficient, and probabilistic measure.

7. The computer-implemented method according to claim 6 further comprising calculating an action cohesion index, by the processing machine on the computer, corresponding to each activity group, wherein each activity group comprises one or more similar activities, wherein the one or more similar activities are obtained based on the plurality of similarity estimates, wherein the action cohesion index is calculated using the one or more action tuples corresponding to the one or more similar activities.

8. The computer-implemented method according to claim 7 further comprising calculating an entity cohesion index, by the processing machine on the computer, corresponding to each activity group using one or more entity tuples, wherein each of one or more entity tuples corresponds to each of one or more entities associated with the one or more similar activities.

9. The computer-implemented method according to the claim 8 further comprising calculating a coupling index, by the processing machine on the computer, corresponding to each activity group using one or more entity relationship features belonging to the one or more entity tuples associated with the one or more similar activities belonging to the activity group.

10. The computer-implemented method according to the claim 9, wherein the plurality of service characteristics corresponding to the one or more activity groups comprises a ratio of coupling index corresponding to an activity group to a product of the action cohesion index corresponding to the activity group and the entity cohesion index corresponding to the activity group.

11. The computer-implemented method according to the claim 10, wherein the plurality of service characteristics further comprises a normalized abstraction index (NAI), a reuse efficiency index (REI), a capability density index (CDI), a composability index (CI), a autonomy index (AI), and a work unitization index (WUI) corresponding to the one or more activity groups.

12. The computer-implemented method according to the claim 1 further comprising providing a visual interface for modifying each activity group to obtain one or more modified activity groups.

13. The computer-implemented method according to the claim 1 further comprising publishing one or more candidate services.

14. The computer-implemented method according to the claim 1, wherein the one or more service analysis objectives include one or more business objectives and a one or more technical objectives.

15. The computer-implemented method according to the claim 1, wherein the inference corresponds to at least one of a candidate service identification, a service portfolio evaluation, a service impact analysis.

16. A computer program product comprising:
computer-readable medium having computer-readable program code stored thereon, the computer-readable program code comprising instructions that, when executed by a processing machine, cause the processing machine to:
receive business model data comprising one or more activities, wherein each activity comprises an action and an entity;
group the one or more activities based on a plurality of similarity estimates between the one or more activities to obtain one or more activity groups;
determine from the business model data a plurality of service characteristics for each activity group; and
determine an inference using the plurality of service characteristics of each activity group based on one or more service analysis objective, wherein the determined inference facilitates to identify one or more services of the service based system which are to be exposed.

17. The computer program product of claim 16, wherein the computer-readable code further comprises instructions that, when executed by the processing machine, cause the processing machine to obtain one or more action tuples corresponding to the one or more activities using the business model data, wherein one action tuple corresponds to one activity, wherein an action tuple comprises a process feature, a role feature, a first entity feature, a first entity state feature, and a transition feature, wherein the process feature comprises one or more processes associated with an activity corresponding to the action tuple, wherein the role feature comprises one or more roles associated with the activity, wherein the first entity feature comprises one or more entities associated with the activity, wherein the first entity state feature comprises one or more entity states associated with the activity, and wherein the transition feature comprises one or more transition activities to which the activity transitions.

18. The computer program product of claim 17, wherein the computer-readable code further comprises instructions that, when executed by the processing machine, cause the processing machine to obtain one or more proximity matrices corresponding to the process feature, the role feature, the first entity feature, the first entity state feature, and the transition feature, wherein the one or more proximity matrices is obtained using the one or more action tuples.

19. The computer program product of claim 18, wherein the computer-readable code further comprises instructions that, when executed by the processing machine, cause the processing machine to obtain one or more entity tuples corresponding to the one or more entities using the business model data, wherein one entity tuple corresponds to one entity, wherein an entity tuple comprises an entity type feature, a second entity state feature, and an entity relationship feature, wherein the entity relationship feature comprises a second entity feature, a cardinality feature, and a participation feature, wherein the entity type feature comprises a type of an entity corresponding to the entity tuple, wherein the second entity state feature comprises one or more entity states associated with the entity, wherein the second entity feature comprises one or more entities associated with the entity, wherein the cardinality feature comprises minimum count of associations of the one or more entities associated with the entity, wherein the participation feature comprises maximum count of associations of the one or more entities associated with the entity.

20. The computer program product of claim 19, wherein the computer-readable code further comprises instructions that, when executed by the processing machine, cause the processing machine to obtain an entity proximity matrix using the one or more entity tuples.

21. The computer program product of claim 20, wherein the computer-readable code further comprises instructions that, when executed by the processing machine, cause the processing machine to obtain a cumulative proximity matrix using the one or more proximity matrices and the entity proximity matrix, wherein the cumulative proximity matrix comprises the plurality of similarity estimates between the one or more activities, wherein the plurality of similarity estimates are obtained using at least one of Jaccard Distance measure, Manhattan Distance measure, correlation coefficient, and probabilistic measure.

22. The computer program product of claim 21, wherein the computer-readable code further comprises instructions that, when executed by the processing machine, cause the processing machine to calculate an action cohesion index corresponding to each activity group, wherein each activity group comprises one or more similar activities, wherein the one or more similar activities are obtained based on the plurality of similarity estimates, wherein the action cohesion index is calculated using the one or more action tuples corresponding to the one or more similar activities.

23. The computer program product of claim 22, wherein the computer-readable code further comprises instructions that, when executed by the processing machine, cause the processing machine to calculate an entity cohesion index corresponding to each activity group using one or more entity tuples, wherein each of one or more entity tuples corresponds to each of one or more entities associated with the one or more similar activities.

24. The computer program product of claim 23, wherein the computer-readable code further comprises instructions that, when executed by the processing machine, cause the processing machine to obtain calculate a coupling index corresponding to each activity group using one or more entity relationship features belonging to the one or more entity tuples associated with the one or more similar activities belonging to the activity group.

25. The computer program product of the claim 24, wherein the computer-readable code further comprises instructions that, when executed by the processing machine, cause the processing machine to calculate the plurality of service characteristics comprising a normalized abstraction index (NAI), a reuse efficiency index (REI), a capability density index (CDI), a composability index (CI), an autonomy index (AI), and a work unitization index (WUI) corresponding to each activity group.

26. The computer program product of claim 16, wherein the computer-readable code further comprises instructions that, when executed by the processing machine, cause the processing machine to provide a visual interface for modifying each activity group to obtain one or more modified activity groups.

27. The computer program product of claim 16, wherein the computer-readable code further comprises instructions that, when executed by the processing machine, cause the processing machine to publish one or more candidate services.

* * * * *

UNITED STATES PATENT AND TRADEMARK OFFICE
CERTIFICATE OF CORRECTION

PATENT NO. : 8,457,998 B2  
APPLICATION NO. : 13/049231  
DATED : June 4, 2013  
INVENTOR(S) : Naveen Narayanrao Kulkarni and Deepti Parachuri Page 1 of 3

It is certified that error appears in the above-identified patent and that said Letters Patent is hereby corrected as shown below:

On the title page  
Item (54) Title, "computer implemented" should read -- computer-implemented --.  
Item (54) Title, "service based" should read -- service-based --.  
Item (57) Abstract, line 2, "service based" should read -- service-based --.  
Item (57) Abstract, line 4, "is" should read -- are --.  
Item (57) Abstract, line 9, "service based" should read -- "service-based --.  
In the specification  
Column 1, line 1, "computer implemented" should read -- computer-implemented --.  
Column 1, line 2, "service based" should read -- service-based --.  
Column 1, line 10, "service based" should read -- service-based --.  
Column 1, line 45, "aids" should read -- aid --.  
Column 1, line 54, "service based" should read -- service-based --.  
Column 1, line 60, "is" should read -- are --.  
Column 1, line 67, "service based" should read -- service-based --.  
Column 2, line 8, "service orientation" should read -- service-orientation --.  
Column 2, line 28, "service based" should read -- service-based --.  
Column 2, line 52, "service based" should read -- service-based --.

Column 6, lines 36-38, " Normalized size measure $s = \sqrt{\frac{\sum_{j=1}^{y}(\sum_{i=1}^{n} x_{ij})^2}{y}}$ " should read -- Normalized size measure $s = \sqrt{\frac{\sum_{j=1}^{y}(\sum_{i=1}^{n} x_{ij})^2}{y}}$ --.

Column 6, lines 42-44, " Information density at depth $d$ is, $ID = \frac{\sum_{i=1}^{k}(E \times 1/x_e)}{y}$ " should read -- Information density at depth $d$ is, $ID = \frac{\sum_{i=1}^{k}(E \times 1/x_e)}{y}$ --.

Signed and Sealed this  
Second Day of February, 2016

Michelle K. Lee  
*Director of the United States Patent and Trademark Office*

CERTIFICATE OF CORRECTION (continued)
U.S. Pat. No. 8,457,998 B2

In the specification

Column 6, line 66, after "one", insert -- or --.

Column 7, line 6, "VS" should read -- ∀S --.

Column 7, lines 23-25, " $P(ES_n \mid R_n) = \dfrac{P(ES_n)P(R_n \mid ES_n)}{\sum_{i=1}^{k} P(ES_k)P(R_k \mid ES_k)} n = 1, 2, \ldots k$ " should read -- $P(ES_n \mid R_n) = \dfrac{P(ES_n) P(R_n \mid ES_n)}{\sum_{i=1}^{k} P(ES_k) P(R_k \mid ES_k)} n = 1, 2, \ldots k$ --.

Column 7, line 36, after "one", insert -- or --.

Column 7, lines 50-51, " $D_{KL}(E) = \ln N + \sum_{i=1}^{N} P(E_i) \ln P(E_i)$ " should read -- $D_{KL}(E) = \ln N + \sum_{i=1}^{N} P(E_i) \ln P(E_i)$ --.

Column 7, lines 64-65, " $D_{KL}(E' \mid S_j) = \ln M + \sum_{i=1}^{M} P(E'_i) \ln P(E'_i)$ " should read -- $D_{KL}(E' \mid S_j) = \ln M + \sum_{i=1}^{M} P(E'_i) \ln P(E'_i)$ --.

Column 8, line 18, after "one", insert -- or --.

Column 8, lines 35-36, " $P_{S_j}(R \mid M) = \sum_{e \in E'} P_e(R \mid M)$ " should read -- $P_{S_j}(R \mid M) = \sum_{e \in E'} P_e(R \mid M)$ --.

Column 8, line 46, after "one", insert -- or --.

Column 8, lines 60-62, " $H_{S_j}(E' \parallel E) = \sum_{E'} P(E') \ln \dfrac{P(E')}{P(E)}$ " should read -- $H_{S_j}(E' \parallel E) = \sum_{E'} P(E') \ln \dfrac{P(E')}{P(E)}$ --.

Column 9, line 7, after "one", insert -- or --.

Column 10, line 10-12, " $a_{ij} = \begin{cases} 1, & \exists s \in \bigcup_{i=1}^{r} S_i \\ 0, & \text{otherwise} \end{cases}$ " should read -- $a_{ij} = \begin{cases} 1, & \exists s \in \bigcup_{i=1}^{r} S_i \\ 0, & \text{otherwise} \end{cases}$ --.

Column 10, lines 27-29, " $\varphi_{act} = \dfrac{\sum_{\substack{i \in Ar \\ j \in Sr}} a_{ij}}{|A_r| \times |S_r|}$ " should read -- $\varphi_{act} = \dfrac{\sum_{\substack{i \in Ar \\ j \in Sr}} a_{ij}}{|A_r| \times |S_r|}$ --.

Column 10, lines 31-34, " $\varphi_{ent} = \dfrac{\sum_{\substack{i \in Ar \\ j \in Sr}} a'_{ij}}{|A_r| \times |E_r|}$ " should read -- $\varphi_{ent} = \dfrac{\sum_{\substack{i \in Ar \\ j \in Sr}} a'_{ij}}{|A_r| \times |E_r|}$ --.

Column 10, lines 35-38, " $a'_{ij} = \dfrac{\sum_{i=1}^{n'} c_{ij}}{|R_e|}$ " should read -- $a'_{ij} = \dfrac{\sum_{i=1}^{n'} c_{ij}}{|R_e|}$ --.

In the specification

Column 11, Figure 18, "$\omega_{act} = \frac{\log\left(\sum_{\substack{i \in A_r \\ j \notin A_r}} (b_{ij} + b_{ji})\right)}{\log(|A| - |A_r|)}$" should read -- $\omega_{act} = \frac{\log\left(\sum_{\substack{i \in A_r \\ j \notin A_r}} (b_{ij} + b_{ji})\right)}{\log(|A| - |A_r|)}$ --.

Column 11, Figure 19, "$\omega_{ent} = \frac{\sum_{e \in E_r} \frac{\vartheta_e \sum_{i \notin A_r} c_i}{A_e}}{E_r}$" should read -- $\omega_{ent} = \frac{\sum_{e \in E_r} \frac{\vartheta_e \sum_{i \notin A_r} c_i}{A_e}}{E_r}$ --.

Column 11, Figure 20, "$\vartheta_e = 1 - \frac{\sum_{i=1}^{n} p_{ij}}{\sum_{j \in E_r}\left(\sum_{j=1}^{m} p_{ij}\right)}$" should read -- $\vartheta_e = 1 - \frac{\sum_{i=1}^{n} p_{ij}}{\sum_{j \in E_r}\left(\sum_{j=1}^{n} p_{ij}\right)}$ --.

Column 11, line 48, "service based" should read -- service-based --.
Column 13, line 9, "limit" should read -- limited --.
Column 13, lines 15-16, "service based" should read -- service-based --.
Column 13, lines 32, "service based" should read -- service-based --.

In the claims

Column 14, line 36, first occurrence, after "each of" insert -- the --.
Column 14, line 36, second occurrence, after "each of" insert -- the --.
Column 15, line 3, delete "a".
Column 15, line 24, "objective" should read -- objectives --.
Column 15, line 26, "service based" should read -- service-based --.
Column 15, line 49, "is" should read -- are --.
Column 16, line 35, after "each of" insert -- the --.
Column 16, line 36, after "each of" insert -- the --.
Column 41, line 41, delete "obtain".